Aug. 16, 1949.  L. L. KUEMPEL  2,479,170
REFRIGERATING APPARATUS FOR VEHICLES
Filed May 7, 1947  3 Sheets-Sheet 1

Leon L. Kuempel, INVENTOR.
BY Dybvig & Dybvig
His Attorneys.

Aug. 16, 1949.  L. L. KUEMPEL  2,479,170
REFRIGERATING APPARATUS FOR VEHICLES
Filed May 7, 1947  3 Sheets-Sheet 2
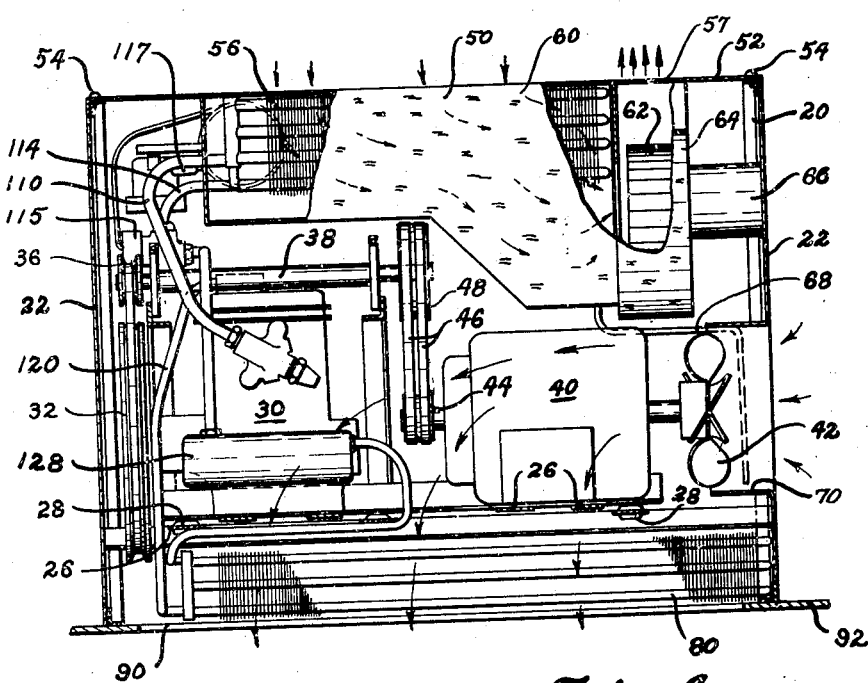
Fig. 4
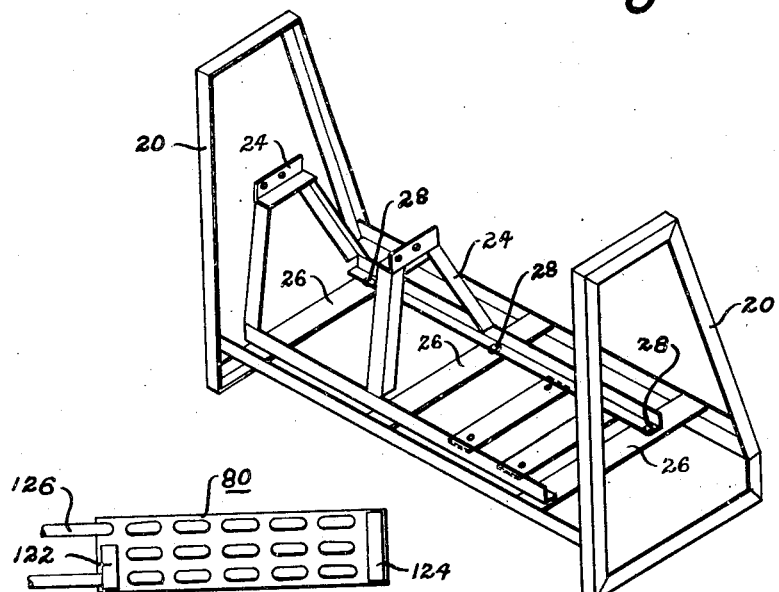
Fig. 5
Fig. 7
Leon L. Kuempel, INVENTOR.
BY Dybvig & Dybvig,
His Attorneys.

Aug. 16, 1949.   L. L. KUEMPEL   2,479,170
REFRIGERATING APPARATUS FOR VEHICLES
Filed May 7, 1947   3 Sheets-Sheet 3

Leon L. Kuempel, INVENTOR.
BY Dybvig & Dybvig,
His Attorneys.

Patented Aug. 16, 1949

2,479,170

UNITED STATES PATENT OFFICE 2,479,170

REFRIGERATING APPARATUS FOR VEHICLES

Leon L. Kuempel, Cincinnati, Ohio

Application May 7, 1947, Serial No. 746,541

27 Claims. (Cl. 62—117)

1

This invention relates to air conditioning apparatus and more particularly to a self-contained unit for use in ambulances, busses, private automobiles and the like.

One object of this invention is to provide a self-contained unit in which the parts are compactly arranged and at the same time are arranged conveniently for servicing, inspection and repair purposes.

It is another object of this invention to provide a self-contained unit in which the arrangement of elements within the outer casing is such that a more efficient shape and size casing may be used for housing the elements.

A further object of this invention is to provide an improved arrangement of headers for the evaporator and condenser units whereby these units may be placed adjacent the top and bottom respectively of the casing and the air streams flowing thereover may be directed downwardly through the units.

Another object of this invention is to provide an improved arrangement of air passages and air circulating means.

Still another object of this invention is to provide a compact air conditioning unit in which the essential parts are conveniently arranged for removal and replacement purposes, and in which the unit as a whole is readily removable without having to disconnect any air ducts or refrigerant lines.

A still further object of this invention is to provide a low cost unit.

It is another object of this invention to provide an improved arrangement for supplying clean air to the condenser compartment of the unit and at the same time provide for ventilating the driver's compartment of the vehicle on which the apparatus is used.

More specifically, it is an object of this invention to supply clean, cool ventilating air to the driver's compartment from a point in front of the engine's radiator and to use air from the driver's compartment for cooling the condenser.

A further object of this invention is to provide an improved arrangement for removing heat generated by the compressor operating means.

Further objects and advantages of the present invention reside in the methods used, the construction and combination of parts used and in the mode of operation as will be apparent from the following description, reference being had to the accompanying drawings wherein a preferred form of the present invention is clearly shown.

In the drawings:

2

Figure 2 is a perspective view of a self-contained air conditioning unit especially designed for use in ambulances and the like;

Figure 4 is a vertical, sectional view showing the internal arrangement of parts in the self-contained unit shown in Figures 1 and 2;

Figure 5 is a perspective view showing the inner and outer frame structure used in supporting the apparatus within the casing;

Figure 7 is a similar end view of the condenser;

Figure 8 is a sectional view of a slightly modified form of my invention which is especially suitable for use in conditioning air for busses and the like.

Figure 1:
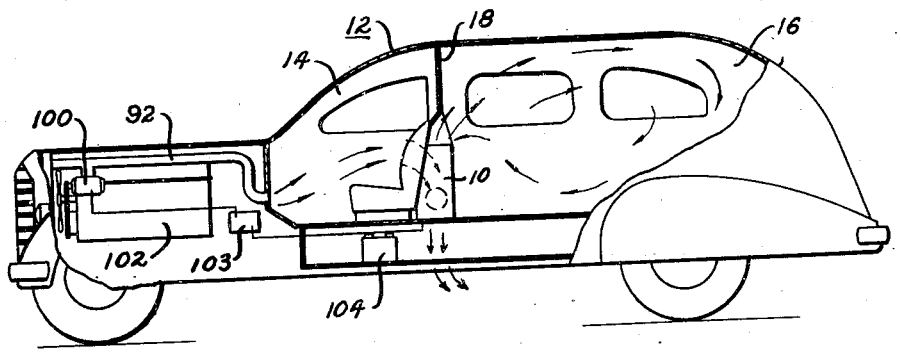
Figure 1 is a schematic elevational view of an ambulance with parts broken away showing the arrangement of the air conditioning unit within the ambulance.
Figure 2:
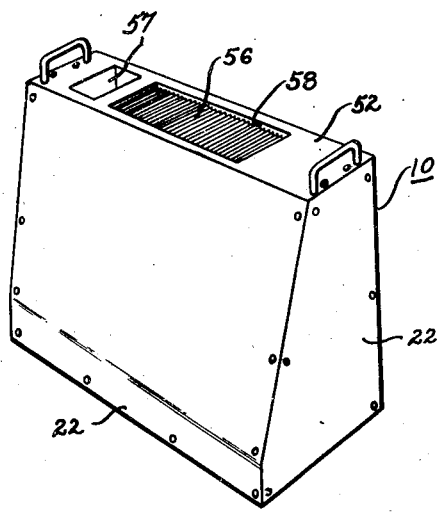

Referring now to the air conditioning unit disclosed in Figures 1 through 6 of the drawings, wherein I have shown a preferred form for use in ambulances and the like, reference numeral 10 designates a casing or a cabinet in which all of the parts of the refrigerating system are mounted. The cabinet 10 is designed as to conveniently fit into the space directly behind the driver's seat with the sloping front panel of the cabinet 10 placed against the sloping back of the driver's seat thus making use of otherwise waste space. As shown in Figure 1 of the drawing wherein I have schematically shown the air conditioning unit 10 mounted within an ambulance 12, the driver's compartment 14 is separated from the passenger compartment 16 by the wall member 18.

As best shown in Figure 5, the air conditioning unit 10 comprises an outer angle iron frame 20 (to which the side panels 22 are removably secured) and an inner angle iron frame 24 which is resiliently supported from the cross bars 26 provided on the outer frame 20. Resilient mounts 28 are used for supporting the inner frame on the outer frame and for damping vibrations originating in the mechanism supported on the inner frame.

The refrigerating system comprising a compressor 30 which for purposes of illustration has been shown as a multiple cylinder reciprocating compressor provided with a fly wheel 32 having a V-shaped groove in its outer periphery for receiving the V-belt 34 drivingly connected to the pulley 36 which is secured to the jack shaft 38 as shown in Figure 4. The compressor 30 and the jack shaft 38 are both supported on the inner frame 24. In the construction shown in Figures 1 through 4 a direct current electric motor 40 is provided for supplying the power for operating the compressor 30 and the condenser air fan 42 which is mounted directly on the main drive shaft of the motor 40. The motor 40 is also mounted on the inner frame 24 and is provided with V-belt pulleys 44 for receiving the V-belts 46 which pass over the drive pulley 48 of the jack shaft 38. The motor 40 is preferably a high speed motor operating at approximately 4,000 R. P. M. so as to provide efficient operation of the condenser fan 42. By using the jack shaft 38 in combination with pulleys of suitable size, it is possible to drive the compressor 30 at its most practical speed which is approximately 800 R. P. M. By mounting the motor 40 along side the compressor 30 in the manner shown, it is possible to confine the vibrations to the inner frame assembly. It is also possible to rigidly support the motor 40, the jack shaft 38, and the compressor 30 in fixed relationship to one another.

An evaporator assembly generally designated by the reference numeral 50 is removably supported within the upper portion of the unit and comprises a top plate 52 which rests directly on the upper ends of the outer frame 20 and is held in assembled relationship thereto by the screws or the like 54. Evaporator 56 is carried directly by the plate 52 immediately beneath the return air inlet openings 58 provided in the plate 52. The evaporator is enclosed within a sheet metal housing 60 which is preferably covered with an insulating coating such as a sheet of cork which not only serves as a heat insulator but also serves as sound insulating means. An evaporator fan comprising a centrifugal fan wheel 62 and a shroud 64 are mounted adjacent one end of the evaporator housing 60 with the air inlet for the fan communicating directly with the lower end of the housing 60 at a point beneath the evaporator 56. In the air conditioning unit disclosed in Figures 1 through 7, the evaporator fan wheel 62 is driven by a small high speed direct current motor which has been designated by the reference numeral 66. Elements 52 through 66 are removable as a unit from the outer frame 20 for inspection and repair purposes.

It will be noted that the air to be conditioned enters the evaporator compartment through the air inlet 58 and flows downwardly over the exposed surfaces of the evaporator and is discharged back into the conditioned space though the air outlet opening 57 provided in the panel 52. The air outlet opening 57 is relatively small whereby the air leaving the opening has enough velocity to flow towards the ceiling of the passenger compartment from whence the air flows downwardly at a reduced velocity into the space occupied by the passengers and is thereafter returned to the air inlet 58.

The condensate collecting on the evaporator 56 will drain into the lower portion of the evaporating housing 60 and will flow through the condensate drain pipe 68 which discharges the condensate water at a point along side the condenser fan flange 70 which is carried by the end panel 22. By disposing of the condensate at this point, the condensate will not be picked up by the condenser cooling air as it leaves the fan 42 but will drip directly on to the condenser 80 located in the lower portion of the cabinet so as not to contaminate the motor 40 or other moving parts.

Figure 3:
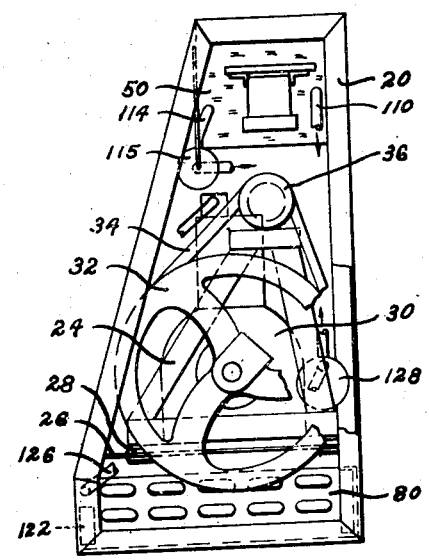
Figure 3 is an end view of the unit shown in Figure 2 with the enclosing panels removed and with parts broken away so as to better show the construction used.
Figure 6:
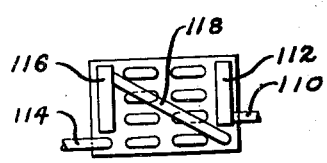
Figure 6 is an end view of the evaporator showing the arrangement of the headers.

The condenser 80 is supported from the outer frame 20 and is arranged as best shown in Figures 3 and 4. By arranging the evaporator which is relatively small in comparison to the condenser in the upper part of the cabinet and the condenser in the lower part of the cabinet, it is possible to make the cabinet narrower at the top than at the bottom without sacrificing size and without unduly crowding the parts. Furthermore, the bottom of the cabinet may be left open so as to fit over an air outlet opening 90 provided in the floor 92 on which the cabinet rests.

Since the efficiency of any refrigerating system is reduced considerably if dirt and dust is allowed to form on the condenser, it is important to provide a supply of clean air for cooling the condenser. Thus, the condenser air inlet is arranged to communicate with the air in the driver's compartment 14 and provision is made to supply make up air to the driver's compartment through the air duct 92 which has its inlet arranged in front of the regular engine radiator at a point considerably above the road level. This arrangement makes it possible to introduce clean outside air directly into the driver's compartment. Any larger particles of dirt or dust which might enter the duct 92 will settle out from the air in the driver's compartment 14 rather than be picked up by the condenser air fan 42.

By virtue of the above described arrangement, it is obvious that the driver's compartment serves as a means for dropping out the larger dirt and dust particles which might interfere with efficient operation of the condenser. Furthermore, the arrangement provides for ventilation of the driver's compartment. Since the motors 40 and 66 combined require an appreciable amount of electric power, I have provided a heavy duty direct current generator 100 which is driven by the main car engine 102. In order to provide a generator having the necessary capacity and yet small enough to fit into the available space, it was necessary to provide means whereby a portion of the air entering the duct 92 is supplied to the housing of the generator 100 so as to cool the same.

The generator supplies power for charging the standby storage battery 104 as well as the motors 40 and 66. The electrical system includes the usual voltage regulator and the reverse current relay 103.

Referring now to the refrigerant circuit, it will be observed (see Figures 4 and 6) that the suction line 110 leading from the evaporator to the compressor is connected to the header 112 of the evaporator which communicates with the three upper coils or passes of the evaporator. The liquid refrigerant is supplied to the evaporator through the liquid line 114 which is directly connected to the lowermost coil of the evaporator which is the last coil to be contacted by the air flowing downwardly through the evaporator. After the liquid refrigerant leaves the lower coil of the evaporator, it is directed into the upper end of the header 116 through the line 118. It has been found that the efficiency of the evaporator is considerably increased by using the above described arrangement for directing the flow of refrigerant through the various coils of the evaporator.

The compressed refrigerant leaves the compressor through the line 120 which supplies the relatively warm compressed refrigerant vapor to the condenser header 122 which in turn distributes the incoming gas through the two lower coils of the condenser. The refrigerant leaves the two lower condenser coils through the header 124 which then directs the refrigerant through the uppermost condenser coil as shown in Figure 7. The condensed refrigerant leaves the condenser through the line 126 which leads into a small size receiver 128. The above described condenser coil arrangement not only improves the efficiency of the condenser but also makes it possible to use a much smaller receiver than would otherwise be required.

In order to simplify this disclosure, the usual drier cartridge and heat interchange and vibration damping connections between the various parts of the refrigerant system have not been shown.

The flow of refrigerant from the receiver 128 to the evaporator 56 is controlled by means of a thermostatic expansion valve 115 arranged in the line 114. The valve 115 is provided with the usual thermostatic bulb 117 which is arranged in thermal exchange with the evaporator outlet line 110 and which serves its usual function of restricting flow of refrigerant through the valve 115 in response to a predetermined decrease in the temperature of the line 110 in accordance with well-known practice.

Figure 8:
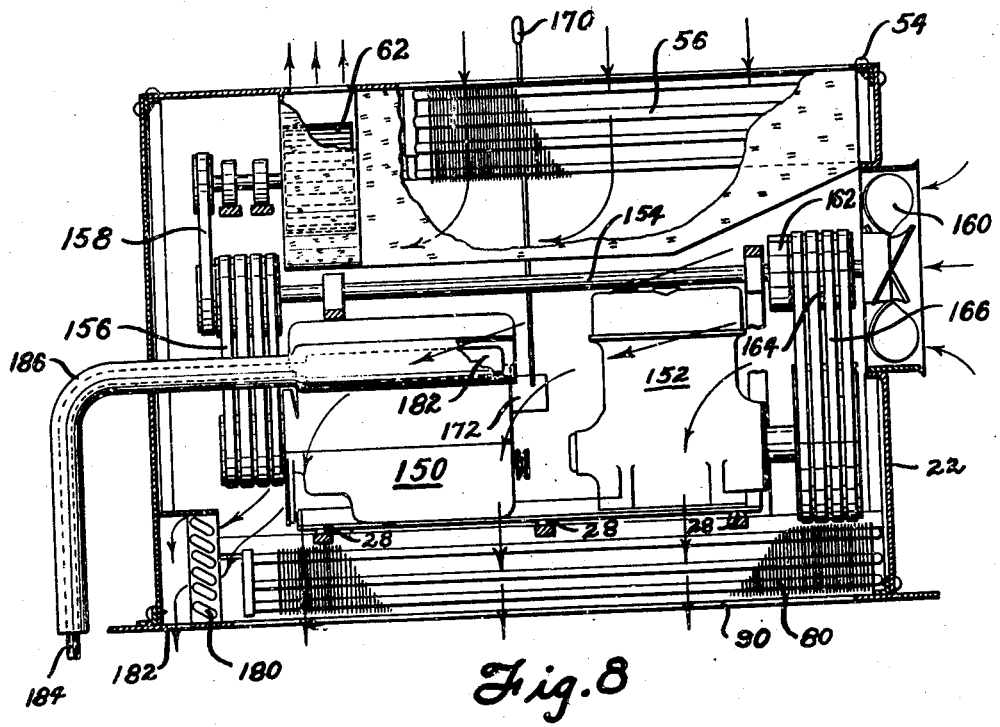
Figure 9:
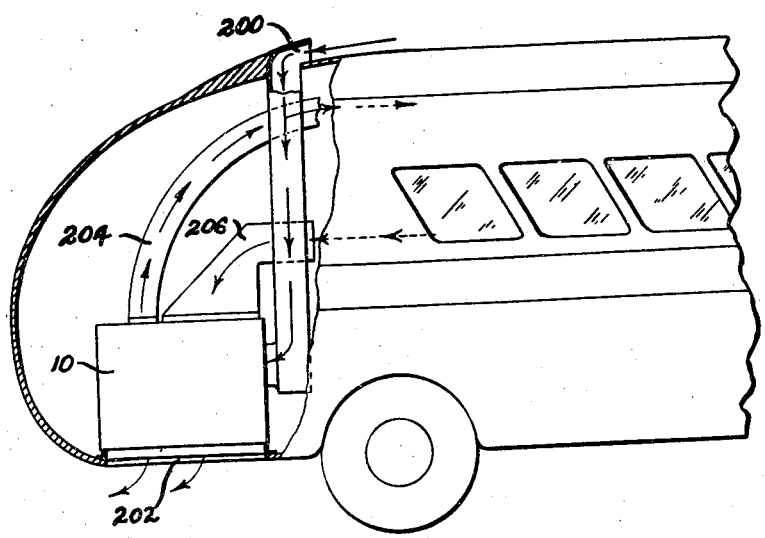
Figure 9 is an elevational view of a bus, with parts broken away, showing the arrangement of the air conditioning unit within a bus.

In Figures 8 and 9 of the drawings, I have shown a slightly modified arrangement in which an internal combustion engine 150 drives the compressor 152 through a system of belts and pulleys comprising the jack shaft 154 arranged above the engine and the compressor, in the manner shown. The engine 150 preferably operates continuously and drives the jack shaft 154 through the multiple belt arrangement generally designated by the reference numeral 156. In the arrangement disclosed in Figures 1 through 5 of the drawing, the evaporator blower 62 was driven by an electric motor 66 whereas in the arrangement disclosed in Figure 8 the corresponding evaporator blower 62 is driven by means of power supplied from the engine 150 through the V-belt drive 158. The condenser air circulating fan 160 is directly attached to one end of the jack shaft 154 so as to be operated at all times when the jack shaft 154 is in operation. A speed responsive clutch 162 is provided for drivingly connecting the V-belt pulley 164 to the jack shaft 154. The compressor 152 is driven by means of the belts 166 which are driven by the pulley 164. The speed responsive clutch 162 is of the type which is operative to drive the pulley 164 at all times when the speed of the shaft 164 exceeds a given speed such as 1800 R. P. M. The speed of the engine 150 is controlled by the throttle means 172 which in turn may be controlled manually or automatically by some suitable means such as the thermostat 170 which is arranged in thermal exchange with the air entering the evaporator compartment. The thermostat 170 and the speed responsive clutch 162 are adjusted so that when the temperature of the return air indicates that no refrigeration is required the speed of the engine will drop below 1800 R. P. M. at which time the speed responsive clutch 162 will declutch the compressor whereby no more refrigeration will be supplied but the evaporator fan 62 will continue to provide circulation of air within the conditioned space and likewise the condenser fan 160 will continue to circulate cooling air through the engine compartment of the unit.

In order to simplify the showing in Figure 8 of the drawing, the refrigerant connections have not been shown as the refrigerant connections used in the system shown in Figure 8 are substantially the same as those disclosed in Figures 3 through 7. The radiator 180 which dissipates the heat of the engine 150 is arranged as shown whereby a portion of the air introduced into the engine compartment by the fan 160 flows through the engine radiator 180 and is discharged downwardly through the air outlet opening 182 provided in the floor of the vehicle. The main sources of heat in the engine compartment are the exhaust manifold 182 and the exhaust pipe 184 and in order to dissipate this heat before it has a chance to heat up the main air stream flowing through the engine compartment, I have provided a shroud 186 which is spaced from but surrounds the exhaust manifold 182 and the exhaust pipe 184 so as to provide an air flow passage between the inner wall of the shroud 186 and the outer surface of the exhaust manifold 182 and the exhaust pipe 184. The end of the shroud 186 is open as indicated so as to admit air thereto from the engine compartment. It will be noted that the fan 160 is arranged so as to place the entire engine compartment under pressure at all times when the fan is in operation and consequently a steady stream of air will flow through the shroud 186 at all times when the engine is operating and will very effectively serve as an insulating barrier in that it will carry away the heat from the exhaust manifold before it has the chance to heat up the air in the engine compartment.

The arrangement shown in Figure 8 is suitable for use in ambulances, passenger cars, busses and many other types of air conditioning installations. In Figure 9 of the drawing, I have shown the unit installed in a bus. In the illustrated installation, the condenser cooling air is supplied by means of an air scoop 200 which is arranged to introduce air from a point above the roof of the bus and is exhausted downwardly through the opening 202 in the bottom of the bus. For purposes of illustration the unit has been shown mounted in the rear baggage compartment of the bus. The conditioned air leaves the unit through the duct 204 which is adapted to communicate with the conventional air distributing duct means (not shown) provided on modern busses. The air to be conditioned is supplied to the unit through the return air duct 206 which likewise may be connected to the conventional return air ducts provided in the bus. It is obvious that the unit disclosed herein may be used with any and all types of air distributing systems.

It will be noted that the general arrangement of parts is the same in the unit shown in Figure 8 as in the unit shown in Figure 4 and that the compressor and its prime mover are mounted on a common support suspended from the rest of the structure by means of resilient mounting means 28. In view of the similarity of parts used in the two units shown, the same reference numerals have been used for designating like or similar parts and unless otherwise indicated, parts designated by the same reference numeral are similar or identical.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. In combination; a vehicle; a power source for propelling the vehicle; said vehicle having a driver's compartment and a passenger compartment, a self-contained air conditioning unit disposed within said passenger compartment and including a condenser, an evaporator, a compressor, first means including a fan for flowing air from said driver's compartment into thermal exchange with said condenser, second means including a fan for flowing air to be conditioned in thermal exchange with said evaporator and for discharging said air into said passenger compartment, and a direct current motor for operating said compressor; an air cooled generator drivingly connected to said power source, means for supplying electrical energy from said generator to said direct current motor; and means for supplying fresh outside air from a point adjacent the front of said vehicle into said driver's compartment, said last named means including means for supplying cooling air to said generator.

2. In combination; a vehicle; means forming a plurality of closed compartments on said vehicle one of which serves as the driver's compartment; a main power source for propelling said vehicle; a self-contained refrigerating system including an evaporator, a condenser, a compressor, first means including a fan for flowing air from said driver's compartment in thermal exchange with said condenser, second means including a fan for flowing air to be cooled in thermal exchange with said evaporator, and a direct current motor for operating said compressor; a generator drivingly connected to said power sources for supplying electrical energy to said direct current motor; and means for supplying fresh outside air into said driver's compartment.

3. In a self-contained air conditioning unit, a main frame having a relatively wide bottom portion and a narrow top portion, an auxiliary frame, means for resiliently supporting said auxiliary frame on said main frame, a compressor mounted on said auxiliary frame, a prime mover for said compressor mounted on said auxiliary frame, an evaporator assembly including an evaporator coil, condensate collecting means and a blower for flowing air in thermal exchange with said evaporator, said assembly being removably supported on the relatively narrow top portion of said main frame above said compressor and prime mover, a condenser carried by said main frame and disposed beneath said auxiliary frame, and means including a fan for directing air downwardly through said condenser.

4. In a self-contained air conditioning unit, a main frame having a relatively wide bottom portion and a narrow top portion, an auxiliary frame, means for resiliently supporting said auxiliary frame on said main frame, a compressor mounted on said auxiliary frame, a prime mover for said compressor mounted on said auxiliary frame, an evaporator assembly including an evaporator coil, condensate collecting means and a blower for flowing air in thermal exchange with said evaporator, said assembly being removably supported on the relatively narrow top portion of said main frame above said compressor and prime mover, a condenser carried by said main frame and disposed beneath said auxiliary frame, means including a fan for directing air downwardly through said condenser, said evaporator assembly being so constructed and arranged that the air to be conditioned flows downwardly through the evaporator coil and is discharged upwardly.

5. In a self-contained air conditioning unit, an outer frame, an inner frame resiliently supported on said outer frame, a compressor mounted on said inner frame, a prime mover mounted on said inner frame, power transmitting means drivingly connecting said prime mover to said compressor and comprising a jack shaft supported on said inner frame, an evaporator assembly comprising an evaporator coil, a blower and a blower motor removably mounted on said outer frame, a condenser carried by said outer frame, and refrigerant flow connections between said evaporator, compressor and condenser.

6. In a self-contained air conditioning unit, an outer frame, an inner frame resiliently supported on said outer frame, a compressor mounted on said inner frame, a prime mover mounted on said inner frame, power transmitting means drivingly connecting said prime mover to said compressor and comprising a jack shaft supported on said inner frame, an evaporator mounted on said outer frame, a condenser carried by said outer frame, and refrigerant flow connections between said evaporator, compressor and condenser.

7. In a self-contained air conditioning unit, an outer frame, an inner frame resiliently supported on said outer frame, a compressor mounted on said inner frame and having a drive shaft, power transmitting means between said drive shaft and said compressor comprising a jack shaft supported from said inner frame, an evaporator assembly comprising an evaporator coil, a blower and a blower motor removably supported on said outer frame, a condenser carried by said outer frame, refrigerant flow connections between said evaporator, condenser and compressor, and a fan mounted on said drive shaft for circulating condenser cooling air in thermal exchange with said condenser.

8. In an air conditioning unit, an evaporator having at least three tiers of coils, means for directing air to be conditioned downwardly through said evaporator and thereafter into the space to be conditioned, a condenser having a plurality of tiers of coils, means for directing condenser cooling air downwardly through said condenser, refrigerant translating means for withdrawing vaporized refrigerant from said evaporator and for discharging compressed refrigerant into said condenser, a receiver, means for connecting the outlet of the upper tier of coils of said condenser to said receiver, means for supplying liquid refrigerant from said receiver to the lower tier of coils of said evaporator including refrigerant flow control means, means for directing the refrigerant leaving said lowermost tier of evaporator coils into a header connected to the upper tiers of said evaporator coils, said condenser including a header for a plurality of the lower tiers of the condenser coils, means for directing the refrigerant leaving said compressor into said last named header, said condenser also including a header for directing refrigerant leading said lower tiers of condenser coils into the uppermost tier of condenser coils.

9. In a self-contained cooling unit, an outer frame having a relatively wide bottom portion and a narrow top portion, an inner frame resiliently supported on said outer frame, a compressor mounted on said inner frame, a prime mover for said compressor mounted on said inner frame, an evaporator assembly including an evaporator coil and a blower for flowing air over the evaporator, means for removably supporting said evaporator assembly on said main frame above said compressor and said prime mover, a condenser carried by said main frame and disposed beneath said inner frame, housing means secured to said main frame and forming an air flow passage for the condenser cooling air, said housing means having a side air inlet and a bottom air outlet, a condenser fan mounted adjacent said air inlet and being directly connected to said prime mover for forcing air in thermal exchange with said prime mover, compressor, and condenser, and thereafter out through said bottom air outlet, said evaporator assembly including means for directing air to be cooled to flow downwardly in thermal exchange with said evaporator, and then upwardly from the unit.

10. In combination; a vehicle; means forming a plurality of compartments on said vehicle; one of which constitutes the driver's compartment; a main power source for propelling said vehicle; a self-contained refrigerating system including a cabinet in which is mounted an evaporator, a condenser, a compressor, first means including a fan for flowing air from said driver's compartment in thermal exchange with said condenser, second means including a fan for flowing air to be cooled in thermal exchange with said evaporator and for directing the cooled air into one of said compartments other than said driver's compartment, and a secondary power source for operating said compressor; and means for supplying fresh outside air into said driver's compartment.

11. In a self-contained air conditioning unit; a frame; an evaporator assembly removably supported on said frame adjacent the top of said frame; a condenser supported from said frame and disposed adjacent the bottom of said frame; a refrigerant compressor disposed between said evaporator assembly and said condenser; a compressor operating means disposed between said evaporator assembly and said condenser; power transmitting means between said compressor and said compressor operating means; said evaporator assembly comprising an evaporator, an evaporator fan means for circulating air to be cooled in thermal exchange with said evaporator, and an evaporator housing which separates the air flowing over the evaporator air from the air flowing over said condenser; a condenser fan for circulating air in thermal exchange with said condenser; and panel means secured to said frame and constituting means for directing air leaving said condenser fan downwardly through said condenser.

12. In a self-contained air conditioning unit; a frame, an evaporator assembly removably supported on said frame adjacent the top of said frame; a condenser supported on said frame and disposed adjacent the bottom of said frame; a refrigerant compressor disposed between said evaporator assembly and said condenser; a compressor operating means disposed between said evaporator assembly and said condenser; power transmitting means drivingly connecting said compressor operating means and said compressor; said evaporator assembly comprising an evaporator, an evaporator fan means for circulating air to be cooled in thermal exchange with said evaporator, and an enclosing housing which separates the air cooled by said evaporator from the condenser cooling air; a condenser fan circulating air in thermal exchange with said condenser, and panel means removably secured to said frame and constituting means for directing the air leaving said condenser fan downwardly through said condenser; said panel means including a fan shroud surrounding said condenser fan.

13. In a self-contained air conditioning unit, means forming a cabinet having a side air inlet and a bottom air outlet, a refrigerant condenser disposed adjacent said bottom air outlet, an evaporator, a compressor within said cabinet disposed above said condenser, refrigerant flow connections between said evaporator, compressor and condenser, an internal combustion engine including an exhaust manifold, power transmitting means drivingly connecting said internal combustion engine and said compressor, a condenser fan disposed adjacent said side air inlet and drivingly connected to said internal combustion engine whereby the inside of said cabinet is maintained at a pressure above atmospheric pressure, a shroud enclosing but spaced from said exhaust manifold, said shroud having an opening at one end for the ingress of air from said cabinet and having an outlet at its other end arranged to discharge air passing through said shroud to the outside atmosphere.

14. In a self-contained air conditioning unit, a main frame having a relatively wide bottom portion and a narrow top portion, an inner frame, means for resiliently supporting said inner frame within said outer frame, a compressor mounted on said inner frame, a prime mover drivingly connected to said compressor and mounted on said inner frame, an evaporator assembly including an evaporator coil and a blower for flowing air in thermal exchange with said evaporator coil, means for removably supporting said assembly on said main frame above said compressor and said prime mover, a condenser carried by said main frame and disposed beneath said inner frame, panel means removably secured to said main frame and forming condenser air flow passage means, and a condenser fan directly connected to said prime mover for circulating air in thermal exchange with said prime mover, compressor and condenser, the construction and arrangement of said panel means and said condenser fan being such that the condenser cooling air is directed downwardly through the condenser.

15. In a self-contained air conditioning unit, a main frame having a relatively wide bottom portion and a narrow top portion, an inner frame, means for resiliently supporting said inner frame within said outer frame, a compressor mounted on said inner frame, a prime mover drivingly connected to said compressor and mounted on said inner frame, an evaporator assembly including an evaporator coil and a blower for flowing air in thermal exchange with said evaporator coil, means for removably supporting said assembly on said main frame above said compressor and said prime mover, a condenser carried by said main frame and disposed beneath said inner frame, panel means removably secured to said main frame and forming condenser air flow passage means, and a condenser fan directly connected to said prime mover for circulating air in thermal exchange with said prime mover, compressor and condenser, the construction and arrangement of said panel means and said condenser fan being such that the condenser cooling air is directed downwardly through the condenser, said evaporator assembly including a housing for the evaporator in which condensate is collected, and means for discharging said condensate into the condenser air flow passage.

16. In a self-contained air conditioning unit, means forming a cabinet having an air inlet opening and an air outlet opening in the top wall thereof, an evaporator disposed adjacent said air inlet opening, means including a fan for circulating air in through said inlet opening and out through said outlet opening, said cabinet having a second air inlet opening provided in a side wall thereof and having a second air outlet opening provided in the bottom wall thereof, a condenser mounted adjacent said second outlet opening, a condenser fan mounted adjacent said second air inlet opening, a compressor disposed between said evaporator and said condenser, refrigerant flow connections between said evaporator, compressor and condenser, an internal combustion engine disposed between said evaporator and said condenser and drivingly connected to said compressor, means for separating the air flowing over said evaporator from the air flowing over said condenser, and means for dissipating heat generated by said internal combustion engine comprising a radiator disposed adjacent said second air outlet whereby a portion of the air circulated by said condenser fan flows in thermal exchange with said radiator.

17. In combination, a cabinet having an air inlet opening and an air outlet opening, an internal combustion engine disposed within said cabinet, fan means drivingly connected to said internal combustion engine, said fan means being arranged in said air inlet opening so as to maintain the air in said cabinet at a pressure in excess of the air outside said cabinet, said internal combustion engine having an exhaust manifold, an elongated shroud surrounding the exposed portion of said exhaust manifold and being spaced therefrom whereby an air passage is formed between said shroud and said exhaust manifold, said shroud having the one end thereof exposed to the air under pressure in said cabinet and having its other end exposed to the outside atmosphere whereby air from said cabinet will flow through said shroud so as to dissipate heat from said exhaust manifold.

18. In combination, a cabinet, refrigerating apparatus including refrigerant liquefying means disposed within said cabinet, means for maintaining the air within said cabinet under pressure, said refrigerant liquefying means comprising first and second heat dissipating members, a shroud surrounding at least a portion of said first heat dissipating members and having one end thereof exposed to the air within said cabinet and having the other end thereof projecting into the outside atmosphere whereby heat dissipated by said first heat dissipating member is picked up by the air flowing through said shroud, said cabinet having an air outlet opening in which said second heat dissipating member is located.

19. In an air conditioning unit, an evaporator having at least three tiers of coils, means for directing air to be conditioned downwardly through said evaporator and thereafter into the space to be conditioned, a receiver, refrigerant liquefying means for withdrawing vaporized refrigerant from said evaporator and for supplying liquid refrigerant to said receiver, means for supplying liquid refrigerant from said receiver to the lower tier of coils of said evaporator, and means for directing the refrigerant leaving said lower tier of evaporator coils into a header connected to the upper tiers of evaporator coils, and means for directing the refrigerant leaving said upper tiers of coils to said liquefying means.

20. In an air conditioning unit, an evaporator, means for directing air to be conditioned in thermal exchange with said evaporator, a condenser having a plurality of tiers of coils, means for directing condenser cooling air downwardly through said condenser, refrigerant translating means for withdrawing vaporized refrigerant from said evaporator and for discharging compressed refrigerant into said condenser, a receiver, means for connecting the outlet of the upper tier of coils of said condenser to said receiver, means for supplying liquid refrigerant from said receiver to said evaporator, said condenser including a header connecting a plurality of the lower tiers of the condenser coils, means for directing the refrigerant leaving said refrigerant translating means into said header, said condenser also including a header for directing refrigerant leaving said lower tiers of coils into the uppermost tier of condenser coils.

21. Air conditioning apparatus adapted to be mounted in the baggage compartment of a bus or the like comprising in combination, an internal combustion engine adapted to be removably supported within said baggage compartment, a frame adapted to be removably supported within said baggage compartment, refrigerating apparatus carried by said frame and including a compressor, a condenser and an evaporator, a main jack shaft carried by said frame, power transmitting means between said engine and said jack shaft whereby said jack shaft operates in unison with said engine, a condenser air circulating fan carried by said jack shaft, means including a fan for circulating air to be conditioned in thermal exchange with said evaporator and for discharging the air into the passenger compartment of the bus, a pulley on said jack shaft, a belt cooperating with said pulley and said evaporator fan whereby said evaporator fan operates in unison with operation of said jack shaft and said engine, power transmitting means between said compressor and said jack shaft including a speed responsive clutch, and means for varying the speed of said engine so as to cause declutching of said compressor without stopping the operation of said jack shaft and said fans.

22. In combination with a bus having a wall separating the bus into a passenger compartment and a baggage compartment, a housing removably supported within said baggage compartment, a compressor mounted in said housing, a prime mover, an evaporator assembly including an evaporator coil, condensate collecting means and a blower for flowing air in thermal exchange with said evaporator and for discharging the air into said passenger compartment, said assembly being supported in said housing above said compressor, a condenser mounted within said housing, refrigerant flow connections between said compressor, condenser and evaporator coil, a jack shaft in said housing between said compressor and said evaporator assembly, power transmitting means between said prime mover and said jack shaft, a fan carried by said jack shaft for directing condenser cooling air through said condenser, means drivingly connecting said blower and said jack shaft whereby said blower operates at all times when said jack shaft operates, and power transmitting means between said compressor and said jack shaft.

23. In combination with a bus having a wall separating the bus into a passenger compartment and a baggage compartment, a housing removably supported within said baggage compartment, a compressor mounted in said housing, a prime mover, an evaporator assembly including an evaporator coil, condensate collecting means and a blower for flowing air in thermal exchange with said evaporator coil and for discharging the air into said passenger compartment, said assembly being supported in said housing above said compressor, a condenser mounted within said housing, refrigerant flow connections between said compressor, condenser and evaporator coil, a jack shaft in said housing between said compressor and said evaporator assembly, power transmitting means between said prime mover and said jack shaft, a fan carried by said jack shaft for directing condenser cooling air through said condenser, means drivingly connecting said blower and said jack shaft whereby said blower operates at all times when said jack shaft operates, and power transmitting means between said compressor and said jack shaft, said last named means comprising a speed responsive clutch.

24. In combination with a bus having a wall separating the bus into a passenger compartment and a baggage compartment, a housing removably supported within said baggage compartment, a compressor mounted in said housing, a prime mover, an evaporator assembly including an evaporator coil, condensate collecting means and a blower for flowing air in thermal exchange with said evaporator coil and for discharging the air into said passenger compartment, said assembly being supported in said housing above said compressor, a condenser mounted within said housing, refrigerant flow connections between said compressor, condenser and evaporator coil, a jack shaft in said housing between said compressor and said evaporator assembly, power transmitting means between said prime mover and said jack shaft, a fan carried by said jack shaft for directing condenser cooling air through said condenser, means drivingly connecting said blower and said jack shaft whereby said blower operates at all times when said jack shaft operates, power transmitting means between said compressor and said jack shaft, said last named means comprising a speed responsive clutch, and means for varying the speed of said prime mover so as to cause said clutch to cut in and out the compressor.

25. In combination; a vehicle; means forming a plurality of compartments in said vehicle, one of which constitutes a baggage compartment at the rear of the vehicle and another of which constitutes a passenger compartment; air conditioning apparatus disposed within said baggage compartment and including a main frame removably supported within said baggage compartment, an evaporator supported on said main frame, a condenser supported on said main frame, a refrigerant compressor for withdrawing vaporized refrigerant from said evaporator and for discharging compressed refrigerant into said condenser, first means including a fan for withdrawing air from said passenger compartment and for directing the air thus withdrawn in thermal exchange with the evaporator and for thereafter returning the air to said passenger compartment, jack shaft means supported on said main frame, a fan blade attached to said jack shaft, baffle means supported by said main frame and cooperating with said fan blade for directing condenser cooling air in thermal exchange relationship with said condenser, a prime mover, power transmitting means connecting said prime mover to said jack shaft, and power transmitting means drivingly connecting said compressor to said jack shaft, said last named means including a speed responsive clutch.

26. Air conditioning apparatus for use in combination with a vehicle having a passenger compartment and a baggage compartment at the rear of said passenger compartment comprising in combination, a compressor, a condenser, an evaporator, refrigerant flow connections between said compressor, condenser and evaporator, a jack shaft, an internal combustion engine, power transmitting means drivingly connecting said engine to said jack shaft, first fan means attached to said jack shaft for circulating outside air over said condenser, means enclosing said evaporator and having an air inlet communicating with the rear portion of said passenger compartment and having an outlet for discharging air into the upper rear portion of said passenger compartment, second fan means drivingly connected to said jack shaft for circulating air over said evaporator, means responsive to air conditioning requirements within said passenger compartment for controlling the operation of said engine, and means for mounting said evaporator, condenser, compressor and jack shaft so as to be removable as a unit from said baggage compartment.

27. In an air conditioning system for a bus or the like, a main housing, a jack shaft, means for rotatably supporting said jack shaft within said housing, a prime mover, means drivingly connecting said prime mover to said jack shaft, a refrigerant compressor mounted within said housing below said jack shaft, an evaporator, means for supporting said evaporator in said housing above said jack shaft, a condenser within said housing at a lower elevation than said jack shaft, a condenser cooling air inlet arranged in alignment with said jack shaft, a condenser cooling fan carried by said jack shaft and arranged adjacent said condenser cooling air inlet, baffle means within said housing for directing the air handled by said condenser fan into thermal exchange with said compressor and thereafter said condenser, an evaporator fan supported within said housing for circulating air to be conditioned in thermal exchange with said evaporator, means drivingly connecting said evaporator fan to said jack shaft, means including a speed responsive clutch drivingly connecting said compressor to said jack shaft, and means responsive to changes in air conditioning requirements for varying the speed of said prime mover whereby said compressor may be declutched without stopping the circulation of air by said fans.

LEON L. KUEMPEL.

REFERENCES CITED

The following references are of record in the file of this patent:

UNITED STATES PATENTS

| Number | Name | Date |
| --- | --- | --- |
| 2,053,206 | Sargent | Sept. 1, 1936 |
| 2,303,857 | Numero | Dec. 1, 1942 |
| 2,323,511 | Baker | July 6, 1943 |